US008606490B2

(12) United States Patent
Ando

(10) Patent No.: US 8,606,490 B2
(45) Date of Patent: Dec. 10, 2013

(54) DEVICE AND METHOD FOR CONTROLLING INTERNAL COMBUSTION ENGINE

(75) Inventor: Daigo Ando, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 58 days.

(21) Appl. No.: 13/502,215

(22) PCT Filed: Oct. 19, 2009

(86) PCT No.: PCT/JP2009/067972
§ 371 (c)(1),
(2), (4) Date: Apr. 16, 2012

(87) PCT Pub. No.: WO2011/048644
PCT Pub. Date: Apr. 28, 2011

(65) Prior Publication Data
US 2012/0222652 A1 Sep. 6, 2012

(51) Int. Cl.
*G06F 7/70* (2006.01)
(52) U.S. Cl.
USPC .......................................... 701/112; 123/347
(58) Field of Classification Search
USPC ............... 701/103, 105, 107, 110, 112; 123/90.17, 179.4, 198 D, 198 DB, 123/198 DC, 198 F, 347
See application file for complete search history.

(56) References Cited

U.S. PATENT DOCUMENTS

| 7,908,074 | B2 * | 3/2011 | Nishigaki ................ 701/105 |
| 8,146,556 | B2 * | 4/2012 | Yoshikawa et al. ...... 123/179.16 |
| 8,386,151 | B2 * | 2/2013 | Hattori et al. ............ 701/105 |
| 2002/0043243 | A1 * | 4/2002 | Majima ................... 123/399 |
| 2002/0134334 | A1 * | 9/2002 | Yamada et al. ........... 123/90.17 |
| 2003/0106515 | A1 | 6/2003 | Kondo |

FOREIGN PATENT DOCUMENTS

| JP | 2000-213383 A | 8/2000 |
| JP | 2001-263117 A | 9/2001 |
| JP | 2007-153232 A | 6/2007 |
| JP | 2008-196376 A | 8/2008 |
| JP | 2008-267233 A | 11/2008 |
| JP | 2009-144564 A | 7/2009 |
| WO | 2008129390 A2 | 10/2008 |

* cited by examiner

*Primary Examiner* — John Kwon
*Assistant Examiner* — Johnny Hoang
(74) *Attorney, Agent, or Firm* — Gifford, Krass, Sprinkle, Anderson & Citkowski, P.C.

(57) ABSTRACT

In a hybrid vehicle including an engine provided with a plurality of VVTs (variable valve timing mechanisms) as one motive power source, an ECU increments a time lapse counter when a sensor detects the fact that a greatest-retard command has been output to all VVTs and an operation position of each VVT has actually returned to a greatest-retard position in response to the greatest-retard command. The ECU determines whether count by the time lapse counter has exceeded a predetermined defined time or not, and it does not permit engine stop until count by the time lapse counter reaches the predetermined defined time and permits engine stop when count by the time lapse counter has exceeded the predetermined defined time.

5 Claims, 7 Drawing Sheets

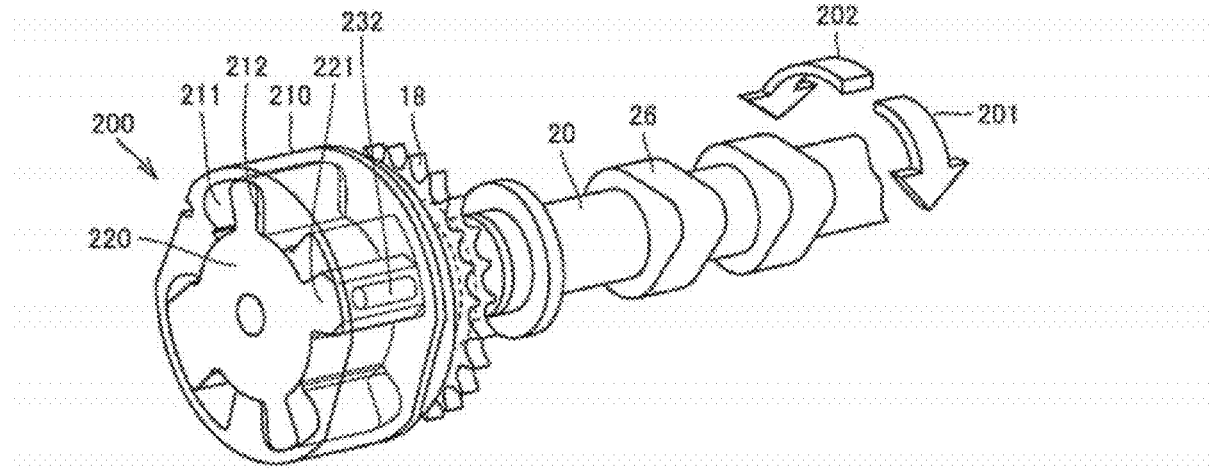
FIG.3
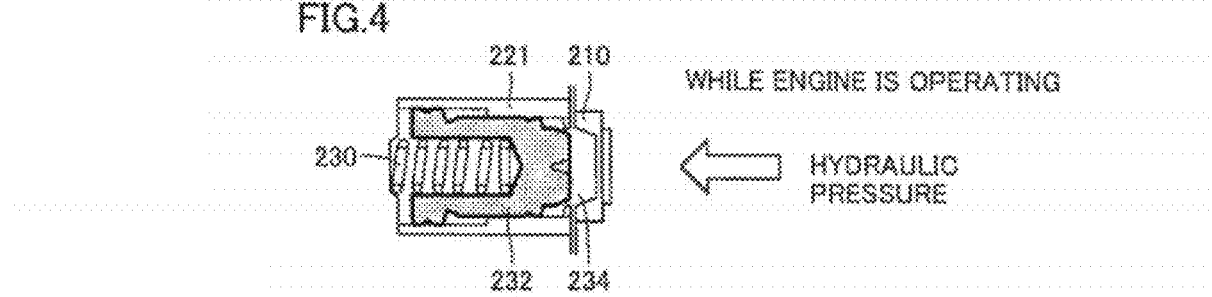
FIG.4 — WHILE ENGINE IS OPERATING ← HYDRAULIC PRESSURE
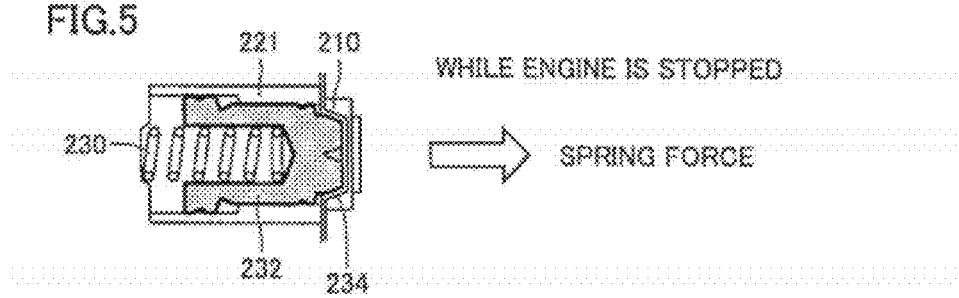
FIG.5 — WHILE ENGINE IS STOPPED → SPRING FORCE
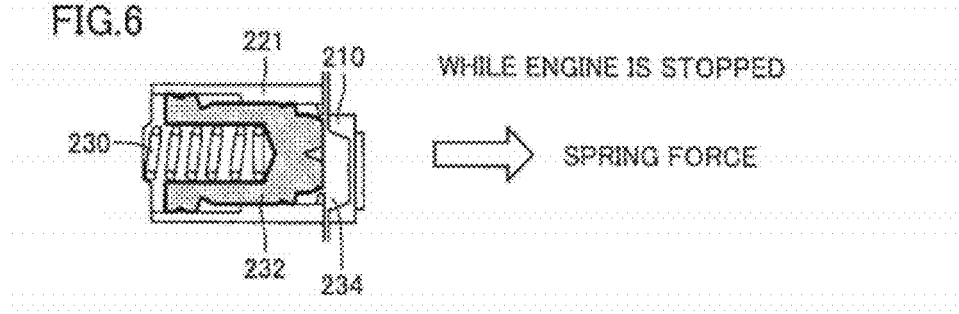
FIG.6 — WHILE ENGINE IS STOPPED → SPRING FORCE

DEVICE AND METHOD FOR CONTROLLING INTERNAL COMBUSTION ENGINE

CROSS-REFERENCE TO RELATED APPLICATIONS

This application is the U.S. national phase of PCT/JP2009/067972 filed Oct. 19, 2009.

TECHNICAL FIELD

This invention relates to control of an internal combustion engine and particularly to control of an internal combustion engine including a variable valve timing mechanism.

BACKGROUND ART

Many engine vehicles recently include a variable valve timing mechanism which operates with a hydraulic pressure originating from motive power from an engine. The variable valve timing mechanism varies timing of opening and closing of an intake valve (or an exhaust valve) by varying a rotation phase of an intake cam (or an exhaust cam) with respect to a crankshaft. In general, this variable valve timing mechanism is provided with a locking mechanism for holding an intake cam at a greatest-retard position when the engine is stopped while the intake cam is at the greatest-retard position (in the exhaust cam, the greatest-advance position). Then, before the engine is stopped, greatest-retard control for returning the intake cam to the greatest-retard position is carried out. As a result of this greatest-retard control, the intake cam is held at the greatest-retard position by the locking mechanism at the time when the engine is started next time (at the time of cranking), and hence vibration of the variable valve timing mechanism at the time when the engine is started is prevented.

Japanese Patent Laying-Open No. 2000-213383 (PTL 1) discloses a technique for starting greatest-retard control above after motor regenerative control is started and stopping an engine at the time point when a sensor subsequently detects return of an intake cam to a greatest-retard position in a hybrid vehicle including as one motive power source, the engine provided with a variable valve timing mechanism configured to be able to vary timing of opening and closing of an intake valve. According to this technique, since the engine is stopped at the time point when the sensor detects return of the intake cam to the greatest-retard position, the intake cam can return to the greatest-retard position before the engine stops.

In addition, PTL 1 also discloses a technique for stopping the engine based on estimation that the intake cam returned to the greatest-retard position at the time point when a predetermined delay time has elapsed since start of greatest-retard control, instead of detection by the sensor of return of the intake cam to the greatest-retard position.

CITATION LIST

Patent Literature

PTL 1: Japanese Patent Laying-Open No. 2000-213383
PTL 2: Japanese Patent Laying-Open No. 2008-196376
PTL 3: Japanese Patent Laying-Open No. 2007-153232

SUMMARY OF INVENTION

Technical Problem

According to PTL 1, however, in some cases, the intake cam cannot reliably return to the greatest-retard position before the engine stops and the intake cam cannot be held by the locking mechanism at the greatest-retard position.

Namely, according to PTL 1, the engine is stopped at the time point when the sensor detects return of the intake cam to the greatest-retard position. Therefore, even if detection per se by the sensor is erroneous due to influence by noise or the like, the engine will be stopped at that time point. In this case, the engine is stopped with the intake cam not having actually returned to the greatest-retard position.

In addition, PTL 1 discloses the technique for stopping the engine based on estimation that the intake cam returned to the greatest-retard position at the time point when the "predetermined delay time" has elapsed since start of greatest-retard control. With this technique, however, it is difficult to optimize the time from start of greatest-retard control until engine stop. Namely, if the "predetermined delay time" is too short, the engine will be stopped with the intake cam not having returned to the greatest-retard position. On the other hand, if the "predetermined delay time" is too long, the engine will needlessly be operated accordingly, which leads to poorer fuel efficiency. In particular in a case where a plurality of variable valve timing mechanisms are provided in a single engine, such as a case where a variable valve timing mechanism is provided in each of left and right banks in what is called a V-engine or a case where a variable valve timing mechanism is provided on each of an intake side and an exhaust side, an operation speed of each variable valve timing mechanism may vary due to variation in hydraulic pressure. In consideration of this variation, the "predetermined delay time" should be set to a greater value, which leads to further poorer fuel efficiency.

The present invention was made to solve the problems described above, and an object thereof is to provide a device and a method for controlling an internal combustion engine capable of reliably returning each operation position of a variable valve timing mechanism at a time point of stop of the internal combustion engine to a corresponding initial position while deterioration in fuel efficiency is suppressed in an internal combustion engine including a plurality of variable valve timing mechanisms.

Solution to Problem

A control device according to this invention controls an internal combustion engine. The internal combustion engine includes a plurality of variable valve timing mechanisms and a plurality of sensors for detecting respective operation positions of the plurality of variable valve timing mechanisms. The control device includes a command portion for outputting a command signal for returning an operation position of each of the plurality of variable valve timing mechanisms to a corresponding initial position when a request for stopping the internal combustion engine is issued, a permission portion for determining whether or not the operation positions of all of the plurality of variable valve timing mechanisms have actually returned to the corresponding initial positions in response to the command signal based on outputs from the plurality of sensors and permitting stop of the internal combustion engine when determination that the operation positions of all of the plurality of variable valve timing mechanisms have actually returned to the corresponding initial positions has continued for a first time period, and a stop portion for causing the internal combustion engine to stop when the request for stopping the internal combustion engine is issued and when stop of the internal combustion engine is permitted.

Preferably, even without permission by the permission portion of stop of the internal combustion engine, when the request for stopping the internal combustion engine is issued and when a time that has elapsed since issuance of the request for stopping the internal combustion engine exceeds a second time period, the stop portion causes the internal combustion engine to stop.

Preferably, the stop portion varies the second time period in accordance with a temperature of the internal combustion engine.

Preferably, each of the plurality of variable valve timing mechanisms includes a locking mechanism for fixing the operation position of the variable valve timing mechanism to the corresponding initial position when the internal combustion engine is stopped while the operation position of the variable valve timing mechanism is at the corresponding initial position.

A control method according to this invention is a control method performed by a device for controlling an internal combustion engine. The internal combustion engine includes a plurality of variable valve timing mechanisms and a plurality of sensors for detecting respective operation positions of the plurality of variable valve timing mechanisms. The control method includes the steps of outputting to the plurality of variable valve timing mechanisms, a command signal for returning an operation position of each of the plurality of variable valve timing mechanisms to a corresponding initial position when a request for stopping the internal combustion engine is issued, determining whether or not the operation positions of all of the plurality of variable valve timing mechanisms have actually returned to the corresponding initial positions in response to the command signal based on outputs from the plurality of sensors, permitting stop of the internal combustion engine when determination that the operation positions of all of the plurality of variable valve timing mechanisms have actually returned to the corresponding initial positions has continued for a predetermined time period, and causing the internal combustion engine to stop when the request for stopping the internal combustion engine is issued and when stop of the internal combustion engine is permitted.

Advantageous Effects of Invention

According to this invention, when a request for stopping the internal combustion engine is issued, in consideration of variation in operation speed of each variable valve timing mechanism, whether the operation positions of all of the plurality of variable valve timing mechanisms have actually returned to the corresponding initial positions or not is determined based on an output from each sensor. In addition, in order to eliminate influence by noise in each sensor, stop of the internal combustion engine is permitted when such determination is made and when such determination has continued for a first time period (a predetermined time period). Thus, the fact that the variable valve timing mechanism has returned to the initial position can properly be determined and the internal combustion engine can be stopped at that time point without being affected by variation in operation speed of each variable valve timing mechanism or noise in each sensor. Consequently, in an internal combustion engine including a plurality of variable valve timing mechanisms, an operation position of each of the variable valve timing mechanism at the time point of stop of the internal combustion engine can reliably return to a corresponding initial position, with deterioration in fuel efficiency being suppressed.

BRIEF DESCRIPTION OF DRAWINGS

FIG. 3 is a perspective view of a variable valve timing mechanism according to the embodiment of the present invention.

FIG. 4 is a cross-sectional view (No. 1) showing an internal structure of a vane portion of the variable valve timing mechanism.

FIG. 5 is a cross-sectional view (No. 2) showing the internal structure of the vane portion of the variable valve timing mechanism.

FIG. 6 is a cross-sectional view (No. 3) showing the internal structure of the vane portion of the variable valve timing mechanism.

DESCRIPTION OF EMBODIMENTS

Figure 1:
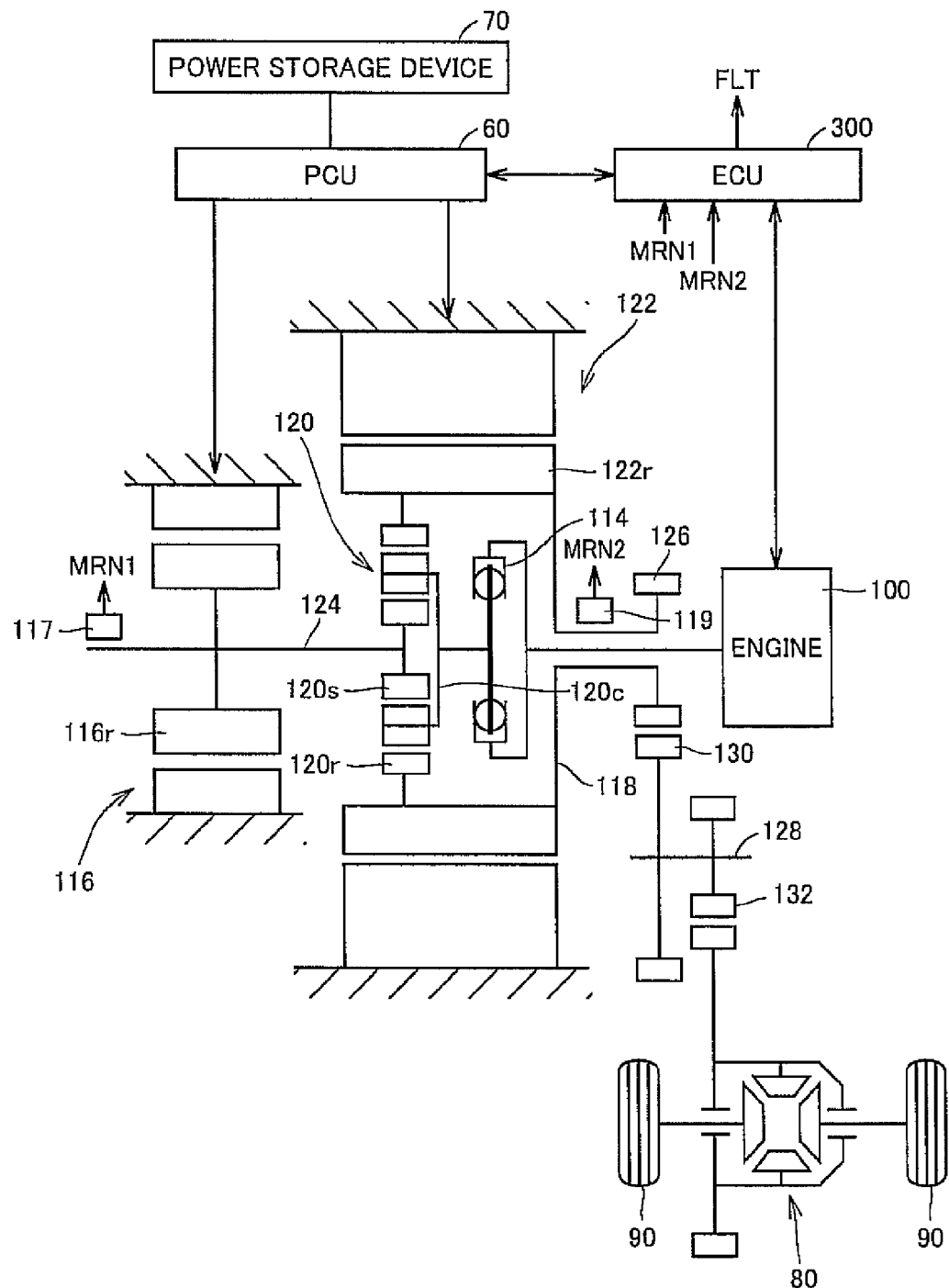
FIG. 1 is a schematic diagram of a vehicle including an ECU according to an embodiment of the present invention.

An embodiment of this invention will be described in detail with reference to the drawings. In the drawings, the same or corresponding elements have the same reference characters allotted and description thereof will not be repeated.

FIG. 1 is a schematic diagram of a vehicle 1 including an electronic control unit (ECU) 300 according to an embodiment of the present invention.

Referring to FIG. 1, vehicle 1 is a hybrid car by way of example, and it includes an internal combustion engine (engine) 100, a damper 114, a power split device 120, a first motor generator 116, a second motor generator 122, ECU 300, a power control unit (PCU) 60, and a power storage device 70.

An output shaft that rotates integrally with a crankshaft of engine 100 which operates as fuel burns is coupled to power split device 120 with spring-type damper 114 being interposed. Damper 114 absorbs fluctuation in rotation of engine 100.

Power split device 120 is made from a single-pinion-type planetary gear mechanism, and it is constituted of three rotational elements of a carrier 120c coupled to damper 114, a sun gear 120s coupled to a motor shaft 124 of first motor generator 116, and a ring gear 120r coupled to a rotor portion 122r of second motor generator 122. Engine 100, damper 114, power split device 120, and first motor generator 116 are arranged as aligned in an axial direction on the same axis, and second motor generator 122 is arranged on an outer circumferential side of damper 114 and power split device 120 in a manner concentric therewith.

Namely, the crankshaft (output shaft) of engine 100 is mechanically connected to motor generators 116 and 122 with power split device 120 being interposed. Then, engine 100, first motor generator 116, and second motor generator 122 rotate with constant relation being kept thereamong. Here, as engine 100 is rotationally driven, rotor portions 116r and 122r rotate in a manner following rotation of the engine.

In addition, an output member 118 of power split device 120 is integrally secured to rotor portion 122r of second motor generator 122 and coupled to ring gear 120r of power split device 120 with that rotor portion 122r being interposed. Output member 118 is provided with an output gear 126. A bevel-gear-type differential gear 80 rotates at a reduced speed by means of a gear wheel 130 and a pinion 132 on an intermediate shaft 128, so that driving force is distributed to each drive wheel 90.

Moreover, rotor portions 116r and 122r of motor generators 116 and 122 are provided with resolvers 117 and 119 for detecting rotation speeds MRN1 and MRN2, respectively. Rotation speeds MRN1 and MRN2 detected by resolvers 117 and 119 are output to ECU 300.

Motor generators 116 and 122 are electrically connected to power storage device 70 with PCU 60 being interposed. Power storage device 70 is a DC power supply device that can be charged and can discharge, and is implemented, for example, by a secondary battery such as a nickel metal hydride battery or a lithium ion battery, an electric double layer capacitor, or the like. PCU 60 includes an independent power conversion portion (such as an inverter) electrically connected to each of motor generators 116 and 122, and controls power supply and reception between power storage device 70 and motor generators 116 and 122. Specifically, PCU 60 causes power storage device 70 to supply power to a motor generator so that the motor generator operates as a motor, whereas it causes the motor generator to return (regenerate) power from the motor generator to power storage device 70 in a case where the motor generator operates as a power generator.

In response to a driver's drive operation, ECU 300 optimally controls drive torque or a rotation speed generated in engine 100, first motor generator 116, and second motor generator 122. Even while the vehicle is running, ECU 300 performs processing for intermittently stopping engine 100 as necessary to cause the vehicle to run only with drive torque generated by second motor generator 122.

Figure 2:
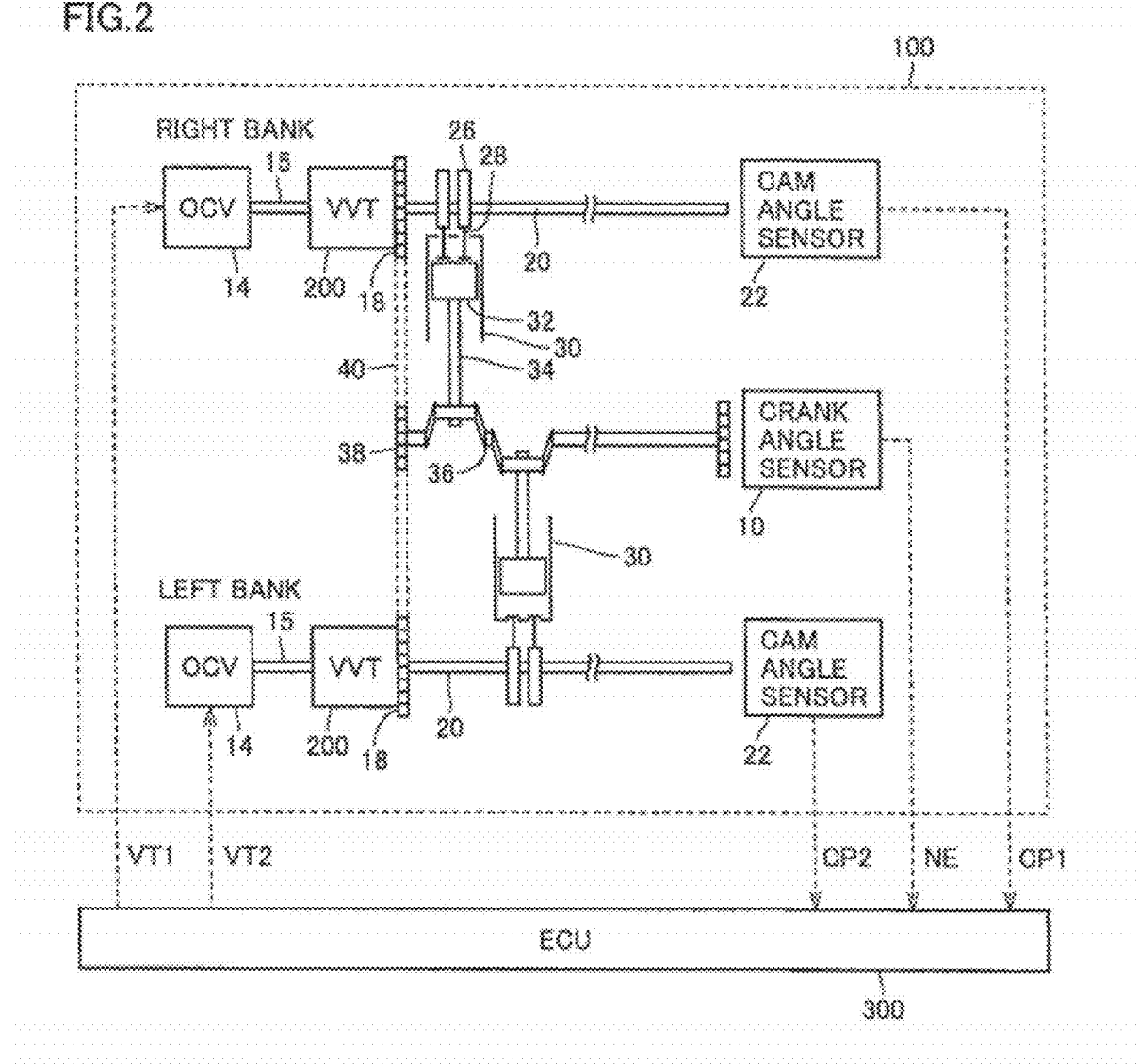
FIG. 2 is a schematic construction diagram of an engine according to the embodiment of the present invention.

FIG. 2 is a schematic construction diagram of engine 100 according to the present embodiment. Engine 100 is what is called a V-engine in which a plurality of combustion chambers are aligned on a left bank side and on a right bank side. Since the left bank side and the right bank side are basically identical in structure to each other, the structure on the right bank side will mainly be described below.

Engine 100 includes a crankshaft 36 rotatably constructed as the output shaft of engine 100, a cylinder 30 provided in a cylinder block, a piston 32 carrying out reciprocating motion in cylinder 30 serving as a combustion chamber, and a connecting rod 34 connecting piston 32 and crankshaft 36 to each other. In addition, engine 100 includes an intake cam shaft 20 (hereinafter also simply referred to as a "cam shaft"), a cam 26 attached to cam shaft 20, and an intake valve 28 that is opened and closed by being pressed by cam 26 as cam shaft 20 rotates. Intake valve 28 is an air valve for opening and closing an air passage communicating from an intake path to the combustion chamber.

In connection with cam shaft 20, a sprocket wheel 18 attached to one end of cam shaft 20 and a sprocket wheel 38 attached to one end of crankshaft 36 are mechanically coupled to each other by a timing chain 40. Thus, cam shaft 20 rotates in coordination with rotation of crankshaft 36.

Engine 100 further includes a variable valve timing mechanism (VVT) 200 for allowing timing to open and close intake valve 28 to be varied by varying a rotation phase of cam shaft 20 with respect to crankshaft 36. VVT 200 is controlled by a hydraulic fluid from an oil control valve (OCV) 14 connected through a hydraulic pressure pipe 15. As will be described later, VVT 200 includes a housing fixed to sprocket wheel 18 and a rotor fixed to cam shaft 20. Then, in response to a timing control signal VT1 from ECU 300 (a timing control signal VT2 with regard to the left bank), OCV 14 allows supply of the hydraulic fluid to an advance chamber or a retard chamber present between a housing portion and a vane portion, so that a rotation phase P1 (a rotation phase P2 with regard to the left bank) of cam shaft 20 with respect to crankshaft 36 continuously varies.

Engine 100 further includes a crank angle sensor 10 for detecting a rotation position of crankshaft 36 and a cam angle sensor 22 for detecting a rotation angle of cam shaft 20 by detecting rotation of a protrusion provided on an end face of cam shaft 20. Crank angle sensor 10 outputs an engine speed signal NE to ECU 300. Cam angle sensor 22 outputs a cam angle signal CP1 (a cam angle signal CP2 with regard to the left bank) to ECU 300.

ECU 300 adjusts timing control signal VT1 such that rotation phase P1 calculated based on engine speed signal NE and cam angle signal CP1 is set to a target phase in accordance with the driver's drive operation, an operating state of the internal combustion engine, and the like. Similarly, ECU 300 adjusts timing control signal VT2 such that rotation phase P2 calculated based on engine speed signal NE and cam angle signal CP2 is set to a target phase in accordance with the driver's drive operation, an operating state of the internal combustion engine, and the like.

FIG. 3 is a perspective view of VVT 200 according to the present embodiment. As shown in FIG. 3, VVT 200 includes a rotor 220 where a vane portion 221 is formed and a housing 210 accommodating rotor 220. Rotor 220 is fixed to cam shaft 20 and it rotates together with cam shaft 20. On the other hand, housing 210 is fixed to sprocket wheel 18 around which timing chain 40 (see FIG. 2) is wound, and it rotates together with sprocket wheel 18.

In addition, in housing 210, an advance chamber 211 and a retard chamber 212 which are hydraulic pressure chambers are formed. Advance chamber 211 and retard chamber 212 are partitioned by vane portion 221. Then, an oil path communicating with OCV 14 (FIG. 2) is independently connected to each of advance chamber 211 and retard chamber 212. When the hydraulic fluid is supplied through that oil path to advance chamber 211 or retard chamber 212, a vane portion 221 moves within housing 210 while keeping hermeticity between advance chamber 211 and retard chamber 212 and varies a volume in each of advance chamber 211 and retard chamber 212. Here, as cam shaft 20 rotates together with rotor 220, rotation phase P1 of cam shaft 20 with respect to crankshaft 36 (see FIG. 2) varies.

In a case where rotation phase P1 is varied in an advancing direction (a direction the same as a direction of rotation of cam shaft 20) shown with an arrow 201, advance chamber 211 is made larger and retard chamber 212 is made smaller. On the other hand, in a case where rotation phase P1 is varied in a retarding direction (a direction opposite to the direction of rotation of cam shaft 20) shown with an arrow 202, advance chamber 211 is made smaller and retard chamber 212 is made larger. It is noted that the hydraulic pressure of the hydraulic fluid supplied to advance chamber 211 and retard chamber 212 is generated by an oil pump (not shown) which rotates as being coupled to crankshaft 36 (see FIG. 2).

Further, in VVT 200 according to the present embodiment, a lock pin 232 for fixing vane portion 221 to a greatest-retard position (a position where rotation phase P1 attains to a greatest-retard phase) when engine 100 stops is provided in vane portion 221.

FIGS. 4 to 6 are cross-sectional views showing an internal structure of vane portion 221. FIG. 4 shows a state of lock pin 232 while engine 100 is operating. FIG. 5 shows a state of lock pin 232 when engine 100 is stopped when vane portion 221 is at the greatest-retard position. FIG. 6 shows a state of lock pin 232 when engine 100 is stopped while vane portion 221 has not returned to the greatest-retard position.

As shown in FIGS. 4 to 6, lock pin 232 movably arranged in a direction of the rotation shaft of cam shaft 20 and biased toward housing 210 by a spring 230 is provided in vane portion 221. On the other hand, in housing 210, a lock hole 234 is formed at a position where lock pin 232 can be fitted when vane portion 221 is in a greatest-retard state. Further, lock pin 232 is formed to be able to generate such force as overcoming spring force applied by spring 230, upon receiving the hydraulic pressure of the hydraulic fluid supplied to advance chamber 211 and retard chamber 212.

As engine 100 operates, an operating hydraulic pressure from the oil pump is supplied and the hydraulic pressure against spring force applied by spring 230 is generated. Therefore, as shown in FIG. 4, lock pin 232 is pushed back toward vane portion 221 and fitting with lock hole 234 is no longer maintained. Thus, vane portion 221 is rotatable with respect to housing 210.

As engine 100 is stopped, supply of the hydraulic fluid is also stopped. Here, when vane portion 221 is at the greatest-retard position, as shown in FIG. 5, lock pin 232 is fitted into lock hole 234 owing to spring force of spring 230. Therefore, vane portion 221 is fixed at the greatest-retard position.

When engine 100 is stopped with vane portion 221 not having returned to the greatest-retard position, however, as shown in FIG. 6, lock pin 232 biased by spring 230 may come in contact with housing 210 at a position other than lock hole 234 and it may not fit into lock hole 234. In such a case, vane portion 221 is not substantially fixed at the greatest-retard position, and vane portion 221 vibratorily fluctuates toward the retard side and the advance side due to vibration caused at the time of cranking (start) for rotating crankshaft 36 for starting engine 100.

In particular, in hybrid vehicle 1 according to the present embodiment, in order to delay the timing to close intake valve 28 (the timing to start compression of an air-fuel mixture) as compared with that of a normal vehicle, the greatest-retard position of vane portion 221 is set on the retard side relative to that in the normal vehicle (that is, an operation range of VVT 200 is expanded toward the retard side). Such setting is also referred to as "decompression" or simply as "decomp", and energy loss in the compression stroke is decreased or shock at the time of start of the engine is lessened. Under the influence by this decompression, in hybrid vehicle 1 according to the present embodiment, in a case where engine torque is output in response to a driver's request, it is necessary to always operate VVT 200 in order to advance the timing to close intake valve 28 and hence frequency of operation of VVT 200 is high.

On the other hand, when this engine 100 is stopped (intermittently stopped) while VVT 200 continues operation, engine 100 will be stopped with vane portion 221 not having returned to the greatest-retard position. In this case, as shown in FIG. 6, lock pin 232 cannot fit into lock hole 234. Therefore, engine 100 should be stopped after return of vane portion 221 to the greatest-retard position is confirmed.

Then, ECU 300 according to the present embodiment initially outputs a greatest-retard command to each VVT 200 in the left and right banks rather than immediately stopping engine 100 when engine stop is requested, and thereafter determines whether or not both of rotation phase P1 on the right bank side and rotation phase P2 on the left bank side have actually returned to the respective greatest-retard phases based on engine speed signal NE and cam angle signals CP1, CP2. When determination that both have returned to the greatest-retard phases continues for a predetermined time period, stop (intermittent stop) of engine 100 is permitted. This feature is the most characteristic feature of the present embodiment.

Figure 7:
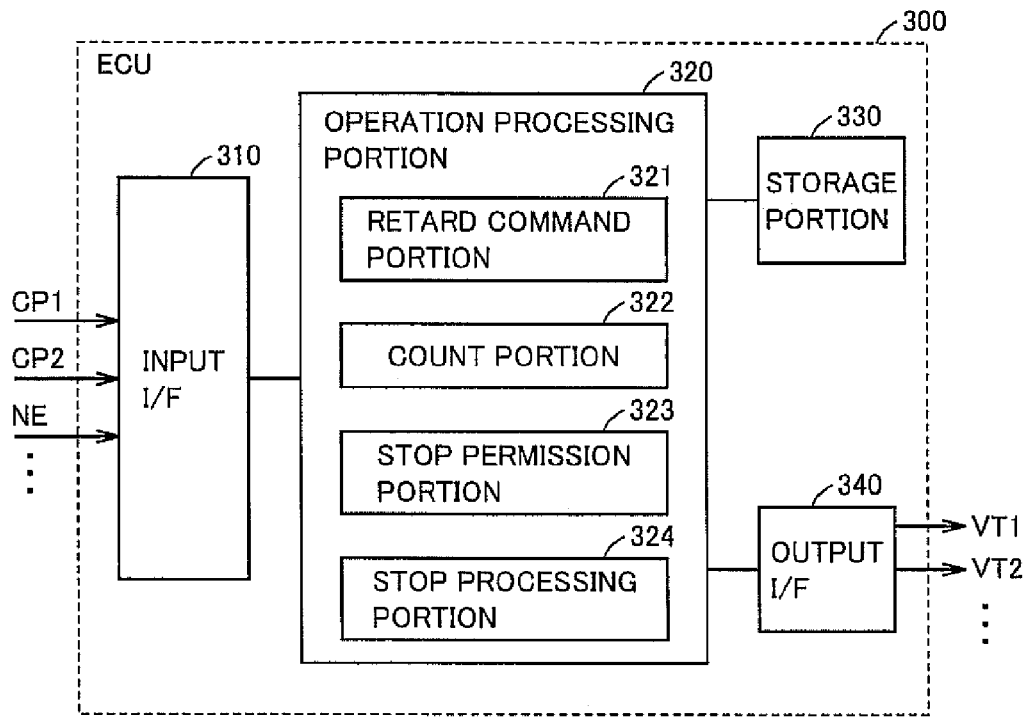
FIG. 7 is a functional block diagram of the ECU according to the embodiment of the present invention.

FIG. 7 shows a functional block diagram of ECU 300. ECU 300 includes an input interface 310, a storage portion 330, an operation processing portion 320, and an output interface 340.

Input interface 310 receives information from each sensor or the like.

Storage portion 330 is implemented by a RAM (Random Access Memory), a ROM (Read Only Memory), or the like. Storage portion 330 stores various types of information, programs, threshold values, maps, and the like, and operation processing portion 320 causes data to be read therefrom or stored therein as necessary.

Operation processing portion 320 is implemented by a CPU (Central Processing Unit) or the like. Operation processing portion 320 performs operational processing based on information from input interface 310 and storage portion 330. A result of processing in operation processing portion 320 is output to each device through output interface 340.

Operation processing portion 320 includes a retard command portion 321, a count portion 322, a stop permission portion 323, and a stop processing portion 324.

Retard command portion 321 determines whether or not engine stop has been requested based on information from each sensor or the like, and when engine stop is requested, it issues a VVT greatest-retard command to the left and right banks. Namely, retard command portion 321 sets both of timing control signals VT1, VT2 to be output to left and right VVTs 200 to "0", in order to set rotation phases P1, P2 of cam shaft 20 in the left and right banks to the greatest-retard phases respectively (hereinafter, description will be given assuming that the greatest-retard phase is "0").

Count portion 322 determines whether or not at least any information of timing control signals VT1, VT2 and actual rotation phases P1, P2 is greater than "0" (on an advance side relative to the greatest-retard phase). This determination is processing for confirming that the greatest-retard command is output to all VVTs from retard command portion 321 and the operation positions of all VVTs have actually returned to the greatest-retard positions which are the initial positions, in response to the greatest-retard command. Then, count portion 322 sets a time lapse counter to "0" until every information indicates "0", starts increment of the time lapse counter at the time point when every information indicates "0", and increments the time lapse counter while such a state that every information indicates "0" continues.

Stop permission portion 323 determines whether count by the time lapse counter has exceeded a predetermined defined time or not. This predetermined defined time is set mainly in consideration of influence by noise in each cam angle sensor 22. Stop permission portion 323 does not permit engine stop until count by the time lapse counter reaches the predetermined defined time. Specifically, it sets an engine stop permission flag to "off". On the other hand, when count by the time lapse counter exceeds the predetermined defined time, stop permission portion 323 permits engine stop. Specifically, it sets the engine stop permission flag to "on".

When engine stop has been requested and when engine stop is permitted (the engine stop permission flag is "on"), stop processing portion 324 performs processing for stopping engine 100.

In addition, taking into account that there may be a case where the engine stop permission flag is not set to on or on thereof cannot be recognized due to communication failure or the like in ECU 300, when a time that has elapsed since request for engine stop was requested has exceeded a prescribed guard time, stop processing portion 324 performs processing for stopping engine 100 even without permission of engine stop. Here, the guard time is variably set based on a temperature of a lubricant of engine 100 (alternatively, for which a temperature of a cooling water may be substituted). Namely, as the temperature of the lubricant is lower (viscosity of the lubricant is higher), it is estimated that a time period required for the VVT to return to the greatest-retard position becomes longer and the guard time is set longer.

Each function of operation processing portion 320 described above may be realized by providing hardware (electronic circuitry or the like) having that function in ECU 300 or by causing ECU 300 to perform software processing (execute a program or the like) corresponding to the function.

FIGS. 8 to 11 are flowcharts each showing a control processing procedure for realizing each function of ECU 300 described above. Each step (hereinafter the step being abbreviated as "S") in the flowcharts shown below is basically performed by software processing by ECU 300, however, it may be performed by hardware processing by electronic circuitry or the like provided in ECU 300.

Figure 8:
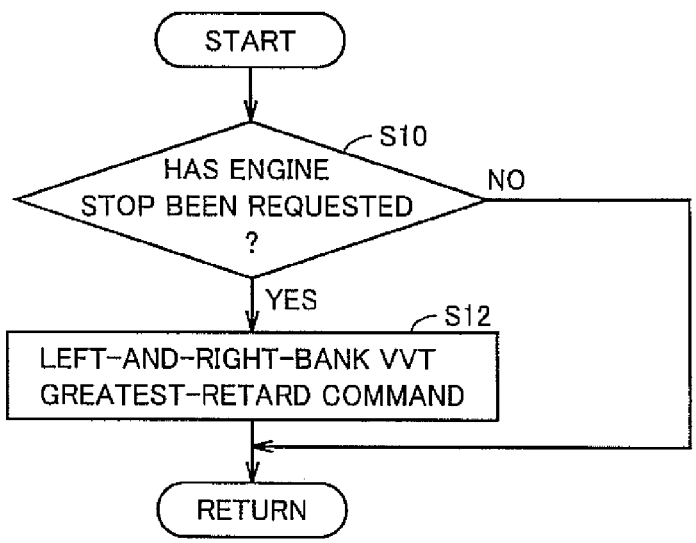
FIG. 8 is a flowchart (No. 1) showing a control processing procedure for realizing a function of the ECU according to the embodiment of the present invention.

FIG. 8 is a flowchart showing a control processing procedure for realizing each function of retard command portion 321 described above.

In S10, ECU 300 determines whether engine stop has been requested or not, based on information from each sensor or the like. When engine stop has been requested (YES in S10), the process proceeds to S12. Otherwise (NO in S10), this process ends.

In S12, ECU 300 issues a VVT greatest-retard command for the left and right banks. Namely, ECU 300 sets both of timing control signals VT1, VT2 to "0" as described above.

Figure 9:
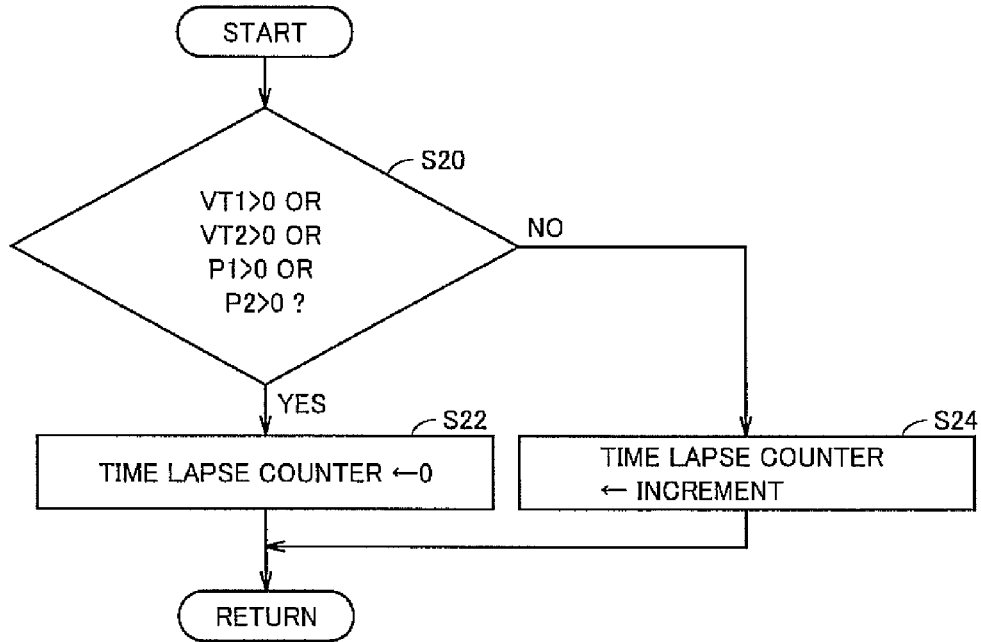
FIG. 9 is a flowchart (No. 2) showing the control processing procedure for realizing the function of the ECU according to the embodiment of the present invention.

FIG. 9 is a flowchart showing a control processing procedure for realizing each function of count portion 322 described above.

In S20, ECU 300 determines whether or not at least any information of timing control signals VT1, VT2 and actual rotation phases P1, P2 is greater than "0" (other than the greatest-retard phase). When affirmative determination is made in this processing (YES in S20), the process proceeds to S22. Otherwise (NO in S20), the process proceeds to S24.

In S22, ECU 300 sets the time lapse counter to "0". In S24, ECU 300 increments the time lapse counter.

Figure 10:
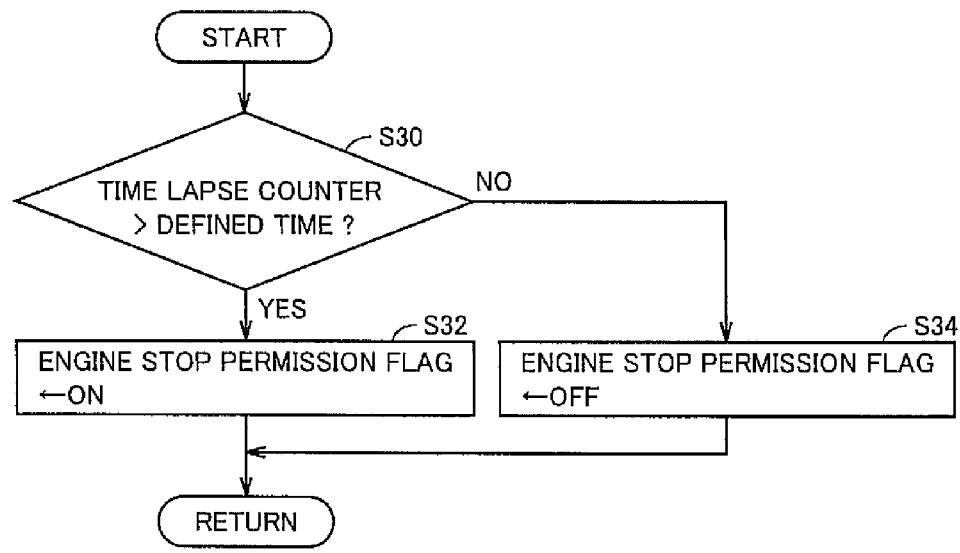
FIG. 10 is a flowchart (No. 3) showing the control processing procedure for realizing the function of the ECU according to the embodiment of the present invention.

FIG. 10 is a flowchart showing a control processing procedure for realizing each function of stop permission portion 323 described above.

In S30, ECU 300 determines whether count by the time lapse counter has exceeded a predetermined defined time or not. When count by the time lapse counter has exceeded the defined time (YES in S30), the process proceeds to S32. Otherwise (NO in S30), the process proceeds to S34.

In S32, ECU 300 sets the engine stop permission flag to "on". In S34, ECU 300 sets the engine stop permission flag to "off".

Figure 11:
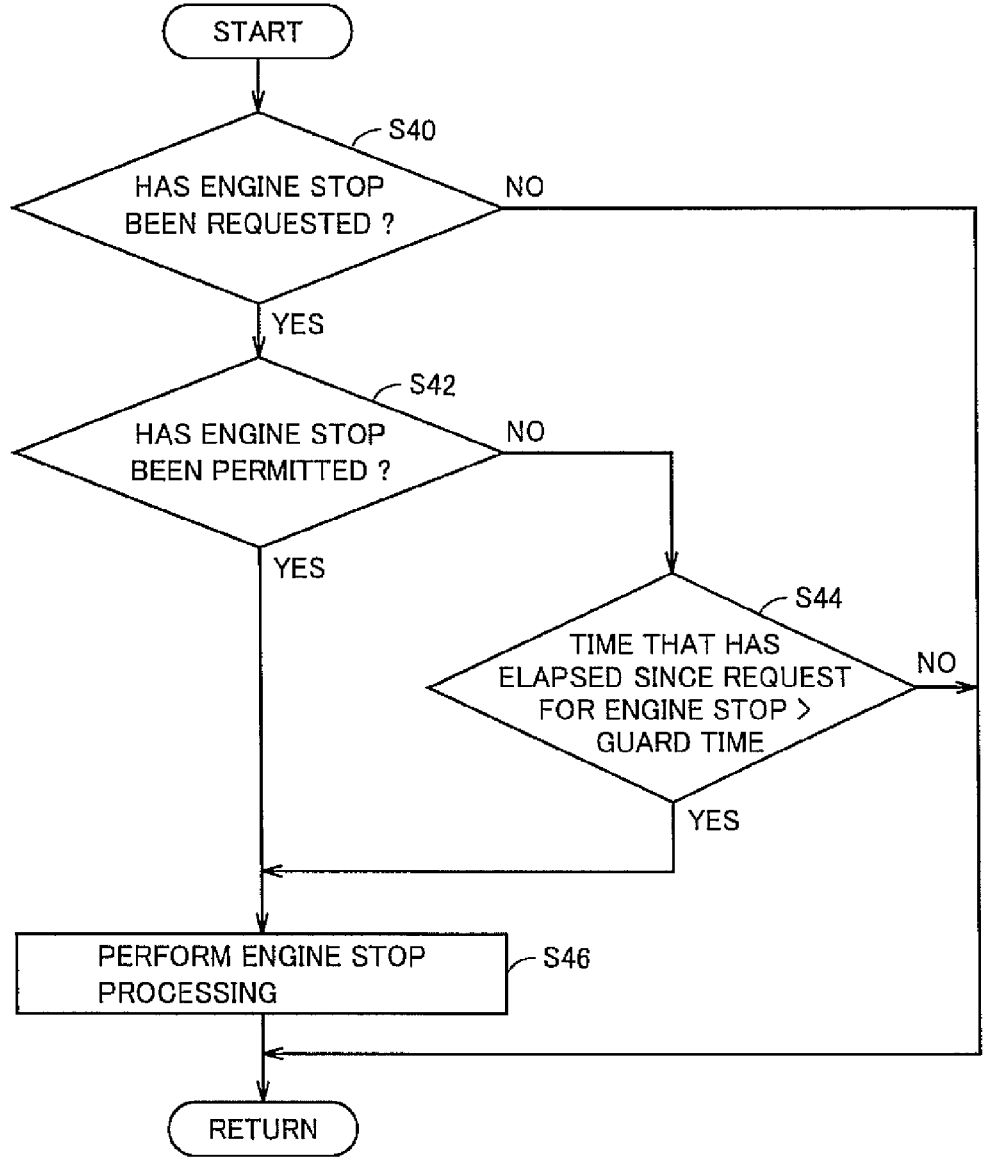
FIG. 11 is a flowchart (No. 4) showing the control processing procedure for realizing the function of the ECU according to the embodiment of the present invention.

FIG. 11 is a flowchart showing a control processing procedure for realizing each function of stop processing portion 324 described above.

In S40, ECU 300 determines whether engine stop has been requested or not. When engine stop has been requested (YES in S40), the process proceeds to S42. Otherwise (NO in S40), this process ends.

In S42, ECU 300 determines whether engine stop is permitted or not (that is, whether the engine stop permission flag is "on" or not). When there is engine stop permission (YES in S42), the process proceeds to S46. Otherwise (NO in S42), the process proceeds to S44.

In S44, ECU 300 determines whether a time that has elapsed since engine stop was requested has exceeded a guard time or not. It is noted that the guard time is variably set based on a temperature of a lubricant of engine 100, as described above. When the time that has elapsed since engine stop was requested has exceeded the guard time (YES in S44), the process proceeds to S46. Otherwise (NO in S44), this process ends.

Figure 12:
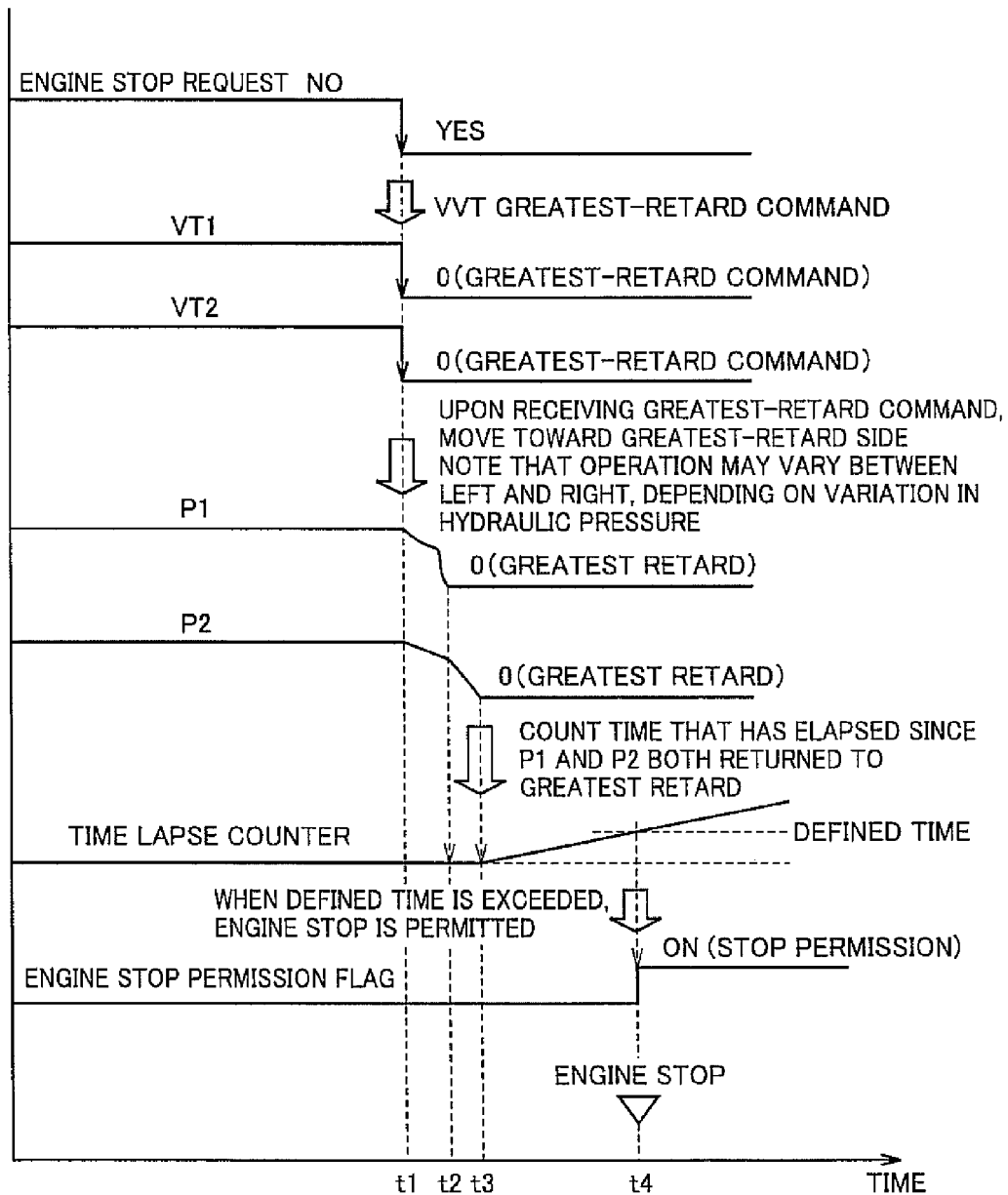
FIG. 12 is a timing chart showing an operation of the ECU according to the embodiment of the present invention.

FIG. 12 is a timing chart showing an operation of ECU 300 after engine stop was requested.

Initially, when engine stop is requested at a time t1, with VT1=VT2=0 being set, the greatest-retard command is output to the left and right VVTs. Upon receiving this greatest-retard command, actual rotation phases P1, P2 start to vary toward the greatest-retard phase "0", however, a rate of change is different depending on variation in hydraulic pressure.

Therefore, not from a time t2 at which only rotation phase P1 attains to the greatest-retard phase "0" but from a time t3 at which both of rotation phase P1 and rotation phase P2 attain to the greatest-retard phase "0", increment of the time lapse counter is started. Namely, with the use of the time lapse counter, a time that has elapsed since both of rotation phases P1, P2 returned to the greatest-retard phase is counted.

Then, at a time t4 at which count by the time lapse counter has reached the defined time set in advance in consideration of influence by noise, the engine stop permission flag is set to on (that is, stop of engine 100 is permitted), so that engine 100 is stopped.

As above, when engine stop is requested, ECU 300 according to the present embodiment does not immediately stop the engine but initially outputs a greatest-retard command to each VVT in the left and right banks and thereafter determines whether or not both of the VVTs in the left and right banks have returned to the greatest-retard positions based on the result of detection by the sensor. When determination that both have returned to the greatest-retard positions has continued for a predetermined defined time period, ECU 300 permits stop of the engine. Thus, the fact that the operation position of the VVT has returned to the greatest-retard position which is the initial position can properly be determined and the internal combustion engine can be stopped at that time point without being affected by variation in operation speed of each VVT or noise in each sensor. Therefore, the time to stop the engine can be optimized while the VVT reliably returns to the greatest-retard position. Therefore, lock pin 232 can reliably be fitted into lock hole 234 at the time when the engine is stopped, with deterioration in fuel efficiency being suppressed.

It is noted that the present embodiment can also be modified, for example, as follows.

In the present embodiment, the present invention is applied to a hybrid vehicle, however, the present invention is not limited as such and the present invention may be applicable to cars of other types.

In addition, in the present embodiment, ECU 300 has been described as a single unit, however, the ECU is not limited as such. For example, a first unit for determining return of a VVT and permitting intermittent stop of the engine and a second unit for performing engine stop processing may separately be provided, and these first and second units may be connected to each other through a communication line. In this case, even though the second unit cannot recognize permission of engine stop by the first unit due to occurrence of communication failure, the engine can be stopped in the present embodiment when the second unit determines that a time that has elapsed since engine stop was requested has exceeded a prescribed guard time (S44, S46 in FIG. 11).

Moreover, in the present embodiment, the present invention is applied to a VVT on an intake valve side, however, in a case where another VVT is also provided, for example, on an exhaust valve side or the like, the present invention should only be applied to all VVTs including the former. It is noted that a lock pin is normally fitted at a greatest-advance position in an exhaust-side VVT. Therefore, for example, in a case where an intake-side VVT and an exhaust-side VVT are provided in left and right banks, when engine stop is requested, a greatest-retard command is output to each intake-side VVT in the left and right banks and a greatest-advance command is output to each exhaust-side VVT in the left and right banks. Thereafter, when determination that each intake-side VVT has returned to a greatest-retard position and each exhaust-side VVT has returned to a greatest-advance position based on a result of detection by each sensor has continued for a predetermined defined time period, stop of the engine should only be permitted.

Further, in the present embodiment, the present invention is applied to a V-engine, however, the present invention is not limited as such and the present invention may be applied to an engine including a plurality of VVTs, other than the V-engine.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 vehicle; 10 crank angle sensor; 14 oil control valve; 15 hydraulic pressure pipe; 18 sprocket wheel; 20 intake cam shaft (cam shaft); 21 exhaust cam shaft; 22 cam angle sensor; 26 cam; 28 intake valve; 30 cylinder; 32 piston; 34 connecting rod; 36 crankshaft; 38 sprocket wheel; 40 timing chain; 60 power control unit (PCU); 70 power storage device; 80 differential gear; 90 drive wheel; 100 internal combustion engine; 114 damper; 116 first motor generator; 116r rotor portion; 117 resolver; 118 output member; 120 power split device; 120c carrier; 120s sun gear; 120r ring gear; 121 vane portion; 122 second motor generator; 122r rotor portion; 124 motor shaft; 126 output gear; 128 intermediate shaft; 130 wheel gear; 132 pinion; 200 variable valve timing mechanism (VVT); 201, 202 arrow; 210 housing; 211 advance chamber; 212 retard chamber; 220 rotor; 221 vane portion; 232 lock pin; 234 lock hole; 300 ECU; 310 input interface; 320 operation processing portion; 321 retard command portion; 322 count portion; 323 stop permission portion; 324 stop processing portion; 330 storage portion; and 340 output interface.

The invention claimed is:

1. A device for controlling an internal combustion engine, said internal combustion engine including a plurality of variable valve timing mechanisms and a plurality of sensors for detecting respective operation positions of said plurality of variable valve timing mechanisms, comprising:
a command portion for outputting a command signal for returning an operation position of each of said plurality of variable valve timing mechanisms to a corresponding initial position when a request for stopping said internal combustion engine is issued;
a permission portion for determining whether the operation positions of all of said plurality of variable valve timing mechanisms have actually returned to said corresponding initial positions in response to said command signal based on outputs from said plurality of sensors and permitting stop of said internal combustion engine when determination that the operation positions of all of said plurality of variable valve timing mechanisms have actually returned to said corresponding initial positions has continued for a first time period; and
a stop portion for causing said internal combustion engine to stop when the request for stopping said internal combustion engine is issued and when stop of said internal combustion engine is permitted.

2. The device for controlling an internal combustion engine according to claim 1, wherein
even without permission by said permission portion of stop of said internal combustion engine, when the request for stopping said internal combustion engine is issued and when a time that has elapsed since issuance of the request for stopping said internal combustion engine exceeds a second time period, said stop portion causes said internal combustion engine to stop.

3. The device for controlling an internal combustion engine according to claim 2, wherein
said stop portion varies said second time period in accordance with a temperature of said internal combustion engine.

4. The device for controlling an internal combustion engine according to claim 1, wherein
each of said plurality of variable valve timing mechanisms includes a locking mechanism for fixing the operation position of said variable valve timing mechanism to said corresponding initial position when said internal combustion engine is stopped while the operation position of said variable valve timing mechanism is at said corresponding initial position.

5. A control method performed by a device for controlling an internal combustion engine, said internal combustion engine including a plurality of variable valve timing mechanisms and a plurality of sensors for detecting respective operation positions of said plurality of variable valve timing mechanisms, comprising the steps of:
outputting to said plurality of variable valve timing mechanisms, a command signal for returning an operation position of each of said plurality of variable valve timing mechanisms to a corresponding initial position when a request for stopping said internal combustion engine is issued;
determining whether the operation positions of all of said plurality of variable valve timing mechanisms have actually returned to said corresponding initial positions in response to said command signal based on outputs from said plurality of sensors;
permitting stop of said internal combustion engine when determination that the operation positions of all of said plurality of variable valve timing mechanisms have actually returned to said corresponding initial positions has continued for a predetermined time period; and causing said internal combustion engine to stop when the request for stopping said internal combustion engine is issued and when stop of said internal combustion engine is permitted.

\* \* \* \* \*